(No Model.)
P. GENDRON.
PROCESS OF MAKING TIRES.
No. 430,845. Patented June 24, 1890.
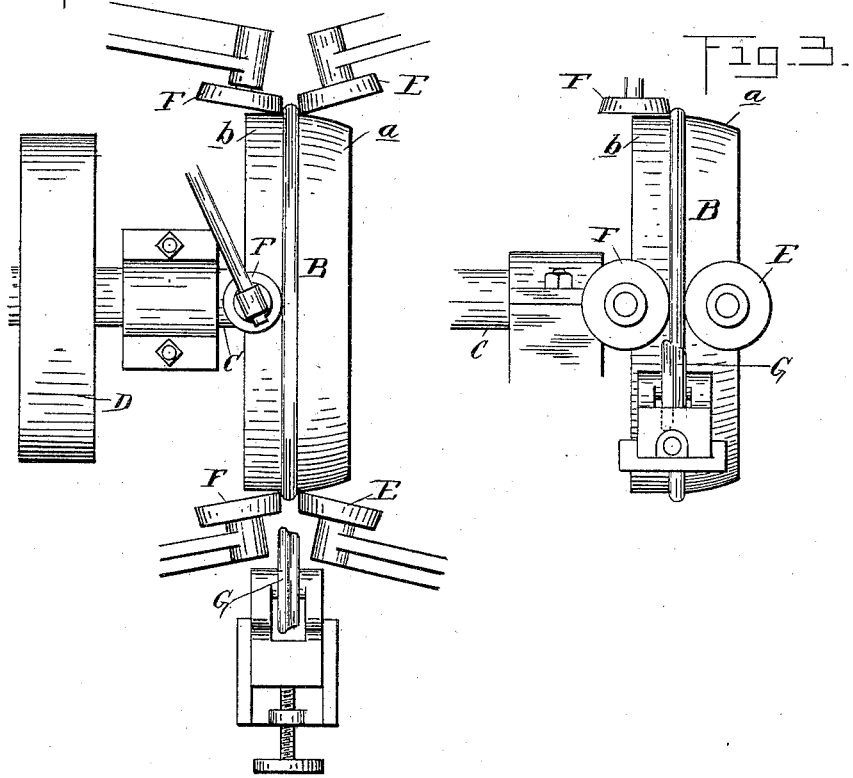
Witnesses
Geo. A. Gregg.
A. B. Eaton
Inventor;
Peter Gendron
By James Whittemore
Atty.

UNITED STATES PATENT OFFICE.

PETER GENDRON, OF TOLEDO, OHIO, ASSIGNOR TO THE GENDRON IRON WHEEL COMPANY, OF SAME PLACE.

PROCESS OF MAKING TIRES.

SPECIFICATION forming part of Letters Patent No. 430,845, dated June 24, 1890.

Application filed January 22, 1890. Serial No. 337,764. (No model.)

*To all whom it may concern:*

Be it known that I, PETER GENDRON, a citizen of the United States, residing at Toledo, in the county of Lucas and State of Ohio, have invented certain new and useful Improvements in the Process of Making Tires, of which the following is a specification, reference being had therein to the accompanying drawings.

This invention relates to new and useful improvements in the process of making wheel-tires. In the present state of the art tires are manufactured by forming a bar of metal into circular form by rolling or otherwise and then welding the ends thereof together. These tires are also rolled for the purpose of taking out the slight inequalities which may still exist in the tire, and it is also known to bring such tires to a uniform size by expanding them. By the present method it has been impossible to construct tires of perfectly circular form of uniform diameter and with the edges thereof parallel and true, which in the manufacture of metal wheels are particularly desirable points.

My invention consists in a process of making tires, first, forming the metal bar into circular shape of smaller diameter than the diameter of the finished tire which is desired to be made; second, expanding such tire upon a circular former, gradually enlarging it at each point of its circumference and rolling its front and rear edges, and, third, in compacting the fibers of the tire by rolling the face thereof against the former. The result of such a process is to produce tires of perfectly-circular shape, and all of a series of tires made by my process will be of exactly the same diameter or the same gage, and planes laid across both sides of such a tire, resting upon the edges thereof, will be parallel at all points; or, in other words, there will be no dishing or curving laterally of the tire, all as more fully hereinafter described.

In the accompanying drawings, Figure 1 is a plan view of a tire as welded, showing in dotted lines the size to which it is expanded in carrying out my process. Fig. 2 is a plan view of the operating parts of a machine designed to carry out my process. Fig. 3 is an elevation thereof.

A is a band of metal formed in substantially circular form, the meeting ends thereof having been welded together. The circular form may be imparted to the band in any known way, and the welding may likewise be accomplished as desired. The tire thus constructed I make of smaller diameter than the diameter of the finished tire.

B is a circular former or head, having a tapering portion *a* and a cylindrical portion *b*. This former is secured upon the shaft C, journaled in suitable bearings, and provided with a pulley D, to which power is transmitted from any source of power to rotate the same, and with it the former B.

E are forcing-rolls arranged in front of the former B, having any suitable mechanism for moving them forward to force the tire upon the former, and to retract them after completing the operation. These rolls are preferably two in number arranged upon opposite sides of the former, the tire being slipped over the tapering end of the former, which is of suitable size to receive the tire. The forcing-rollers are brought to bear against the front edge of the tire while the former is rapidly rotated. The forward motion of the forcing-rollers will press the tire over the tapering portion *a*, thereby slightly expanding it and forcing it tightly upon a cylindrical portion *b*, at the same time rolling the front edge thereof. The rearward motion of the tire upon the cylindrical portion of the head or former is limited by the rear rolls F, stationarily secured beside the former. The effect of two rollers, one rolling the front and the other the rear of the tire, is to roll these edges in perfect parallelism and prevent any dishing or curving laterally of the tire.

G is a side or crushing roller adapted to be brought by any suitable mechanism to bear against the face of the tire during the time that the tire is upon the cylindrical portion of the former. This roll pressing the tire firmly against the head or former will take out any irregularities which might remain after the tire is expanded over the tapering portion, and will also crush or thin the metal, thereby slightly further expanding the tire upon the former. The tire may then be removed in any suitable or desired manner.

In carrying out my process it will be observed that in expanding the tire upon the tapering portion of the head it is done gradually point by point, the forcing-rollers bearing against but two points on the edge of the tire at any time, so that all the points are equally expanded as the former is rotated.

As soon as the tire is expanded upon the cylindrical portion the forcing-rollers act to roll the front edge of the tire and the rear roller to roll the rear edge thereof, the two acting to bring the planes of the front and rear edge in exact parallelism. After this is done the side roller is brought into operation and each point is successively brought into its crushing or rolling effect, rolling it at each point against the former and making it conform exactly to the perfect circular shape thereof. It also slightly expands the tire, compressing its fibers, thereby increasing its strength.

A further beneficial result of my process is to cause the tire to assume its perfected circular shape without tension or strain—that is, if the tire were cut at any point there would be no tendency or tension to cause the ends thereof to draw apart or to overlap each other. This tension or strain, which is present in tires constructed by other means, is a serious obstacle to their use in the manufacture of metal wheels, for as soon as a tire constructed by such process is released from the expanding-machine such tension or strain will act to draw the tire out of its circular form, or to laterally curve the same; and, further, in the practical use of such a tire this strain or tension will often cause breakage or damage.

What I claim is—

1. The herein-described process of making tires, which consists in first forming a metal band into substantially circular shape of less diameter than the finished tire, then expanding the tire gradually upon an enlarging-former, substantially as described.

2. The herein-described process of making tires, which consists in first forming a metal band into substantially circular shape of less diameter than the finished tire, then expanding it upon an enlarging-former, then rolling the front and rear edges into parallelism, substantially as described.

3. The herein-described process of making tires, which consists in first forming a metal band into substantially circular shape of less diameter than the finished tire, then expanding it upon an enlarging-former, then rolling the front and rear edges into parallelism, and then expanding the tire by rolling the face thereof, substantially as described.

In testimony whereof I affix my signature, in presence of two witnesses, this 30th day of November, 1889.

PETER GENDRON.

Witnesses:
 M. B. O'DOGHERTY,
 GEO. A. GREGG.